United States Patent [19]

Hall

[11] 4,040,087
[45] Aug. 2, 1977

[54] ELECTRONIC MOTION COMPENSATION FOR THE PYROELECTRIC VIDICON

[75] Inventor: John T. Hall, Woodbridge, Va.

[73] Assignee: The United States of America as represented by the Secretary of the Army, Washington, D.C.

[21] Appl. No.: 663,033

[22] Filed: Mar. 2, 1976

[51] Int. Cl.² ............................................ H04N 3/16
[52] U.S. Cl. .................................. 358/113; 358/208; 358/220; 358/222
[58] Field of Search ................ 178/7.2, 6.8, DIG. 20, 178/DIG. 40, DIG. 41, DIG. 21, DIG. 8

[56] References Cited
U.S. PATENT DOCUMENTS 2,881,248  4/1959  Wilner .................................... 178/7.2
3,761,615  9/1973  Wreathall ........................ 178/DIG. 8

Primary Examiner—John C. Martin
Attorney, Agent, or Firm—Nathan Edelberg; John E. Holford; Robert P. Gibson

[57] ABSTRACT

An image motion correction is provided for a pyroelectric vidicon which provides a standard television video output signal.

4 Claims, 5 Drawing Figures

ELECTRONIC MOTION COMPENSATION FOR THE PYROELECTRIC VIDICON

The invention described herein may be manufactured, used, and licensed by or for the Government for governmental purposes without the payment of any royalty thereon.

BACKGROUND OF THE INVENTION

Thermal imaging systems have found an increasing number of applications in the military and industry. Thermal gradients in scenes containing strategic military targets are transduced to visible images in real time by means of infrared scanning systems. The improvement of these military infrared systems has resulted in spinoffs into the industrial area. Infrared scanners are used, for example, in railroad environments for hot box detection in wheel bearings as the train passes. The uses in the medical field have only touched the surface of such applications as the detection and localization of cancer cells, sinus conditions and skin difficulties. In forestry thermal imagery can detect diseased trees and sources of forest fires in dense smoke. The applications in factory type environments requiring remote temperature measurements are limited only by expense. The IR microscope has many uses in the research community for location of hot areas in microcircuits and similar small systems.

One of the more potentially promising systems in the low cost infrared scanning community is the pyroelectric vidicon. This device is a simply modified vidicon wherein a pyroelectric target material is substituted for the normal target, and the voltages are modified slightly to include an erasure scheme due to target memory. Operation involves the far infrared scene being focused onto the target material. The pyroelectric effect in the target material reorients the polarization vectors proportional to the rate of change of the two dimensional energy density from the thermal scene. This dynamic detection characteristic means the pyroelectric vidicon can only detect changing thermal scenes, i.e., the device operates in an AC mode. In nonscanned systems, it would detect only moving targets. In many applications, it is desirable to image a stationary scene. This requires some type of scanning system which moves the picture elements (PIXELS) of the thermal scene over a finite portion of the target material. However, the inherent image motion is maintained in the image display device. This moving image is disconcerting and ultimately causes observer fatigue plus prevents direct study of a particular portion of the image for a reasonable time. The target material exhibits a particular temporal response which can be optimized through correct scan speeds of the infrared image over the target material.

BRIEF DESCRIPTION OF INVENTION

The basic objective of the present invention is to provide a means for cancelling the image motion generated in the target material thereby providing a stabilized image in the readout device. The level of correction can be down to the individual picture element of the thermal scene.

A further objective is to provide a motion compensated standard EIA television presentation having 525 lines per frame, 30 frames per second, a 3 by 4 aspect ratio and 2 to 1 interlace which could be transmitted to a standard television receiver at a remote site.

BRIEF DESCRIPTION OF DRAWINGS

The above and other objects of the invention will be best understood with reference to the drawings wherein.

DESCRIPTION OF THE INVENTION

Figure 1:
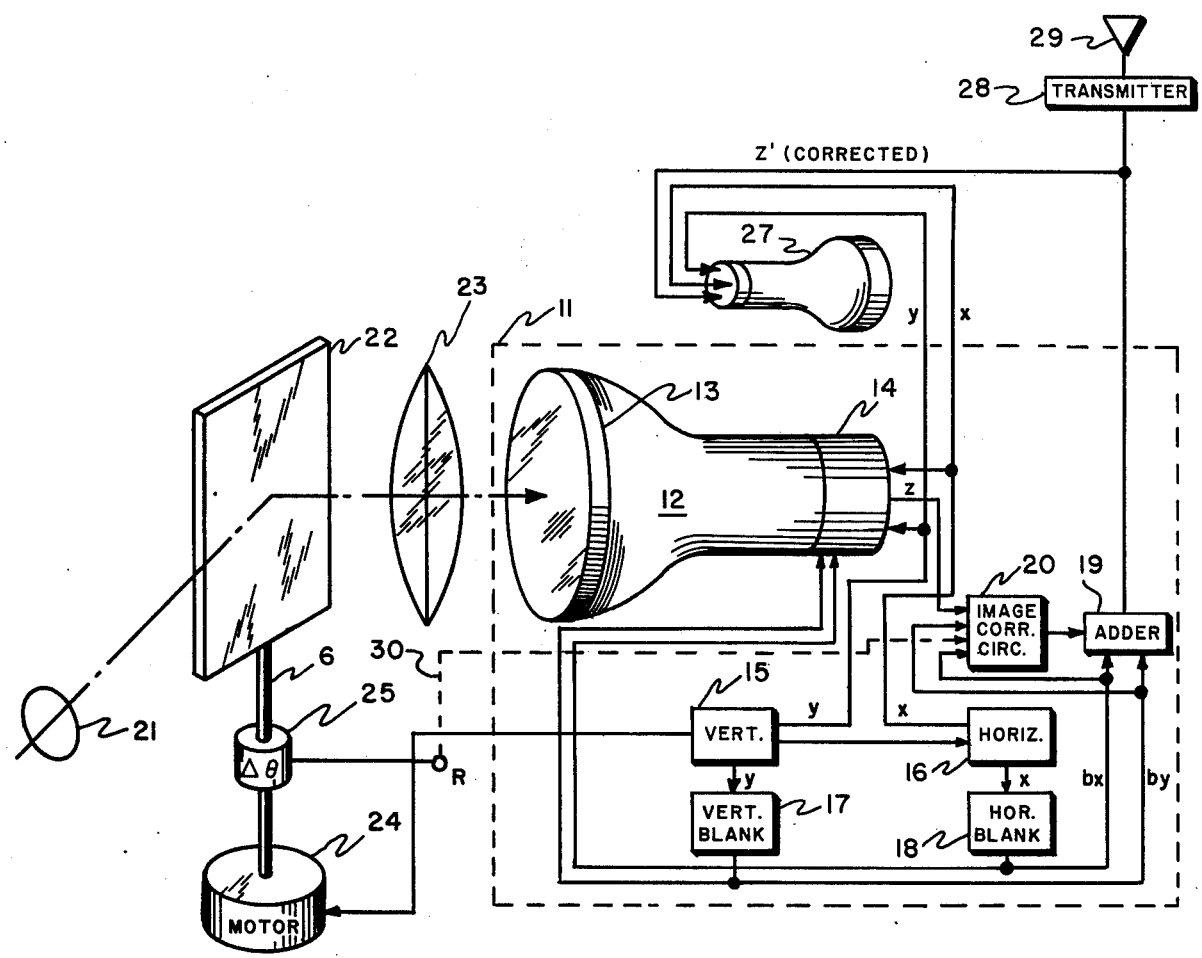
FIG. 1 shows the entire pyroelectric vidicon imaging system.

Referring specifically to FIG. 1 there is shown a complete imaging system according to the present invention. The electronic portions which detect the image and convert it to a video signal are separated by block 11. The heart of the system is a pyroelectric vidicon tube, of which numerous types are available. This vidicon tube has a pyroelectric target 13 mounted at the input end of the tube and an electron gun 14 mounted at the rear of the tube which has an $x$-$y$ electronic magnetic deflection system to permit the electron beam from the gun to be scanned over the target. Standard TV type sawtooth oscillators 15 and 16 are used to provide synchronized 60hz vertical ($y$) and 15,750hz horizontal ($x$) deflection signals to the tube. Ordinary d.c. power supplies, e.g. batteries and or a.c. sources with standard voltage converters (not shown) are provided to power these and other electronic circuits to be described. The video signal ($z$) is derived from the modulation of the beam current in the vidicon as it impinges on diverse areas of the pyroelectric target. The oscillators 15 and 16 also each drive one of the shaping circuits 17 and 18 which supply standard TV blanking, synchronizing and equalization pulses. The blanking pulses $ax$ and $ay$ are fed back to the vidicon beam control electrode to extinguish the beam on horizontal and vertical retrace. The composite signals $bx$ and $by$ consisting of all three types of the above pulses is combined with the video signal ($z$) in adder 19 to provide a corrected video signal ($z'$). The signal $z$ is preconditioned in the present invention by a correction circuit, 19, the purpose of which will be explained in due course.

To energize the target continuously an image is projected through an objective lens 21, reflected from a substantially planar rotating mirror 22 and finally focussed by converging lens 23 onto the target 13. The mirror is driven by motor 24. A servo sensor 25 on the motor shaft 26 provides a signal dependent on the position of the shaft, its velocity and direction of rotation. When the mirror rotates in the chosen scan direction, the velocity signal controls the motor by means of servo sensor 25 to maintain constant speed. Commercial units are available that can easily maintain the speed within 1% of a preselected value. The sensor 25 also furnishes a mirror blanking signal to indicate a period beginning near the end of each scan and ending shortly after the beginning of the next. This mechanical scan period is selected to cover a fixed integral multiple of the frames generated by the electronic portion of the tube, i.e. from the beginning of the first active line in the first frame covered to the end of the last active line in the last frame. The number of frames covered depends on the angular velocity of the mirror (time response of the target material) and the size of the image relative to the size of the target (resolution quality of target material), both of which involve obvious tradeoffs in the size and weight of the finished system. The mirror blanking signal locks the vertical and horizontal oscillators near the end of a mirror cycle, enables them at the beginning of the next mechanical scan scan period and consequently provides appropriate blanking pulses from circuits 17 and 18 during that period. The mirror blanking signal may also be used to reset the image correction circuit through a lead 30; this will be discussed at FIG. 5.

The resulting corrected video signal z' can be viewed on a simple cathode ray tube monitor 27 using the same oscillator signals x and y that were used to generate it. Alternatively the (z') signal alone may be transmitted by coaxial cable to distant monitor or used to drive a transmitter 28. The broadcast signal from antenna 29 can then be received by an ordinary television receiver without modification of any sort.

Figure 5:
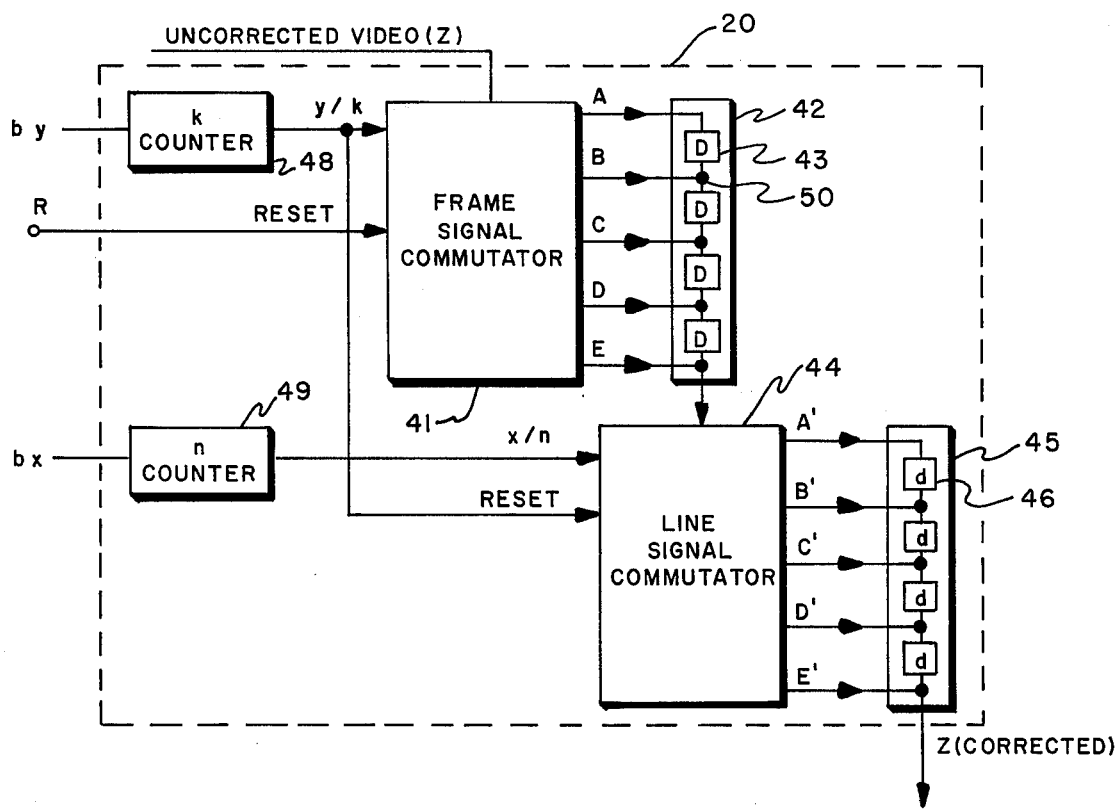
FIG. 5 shows the details of the image correction circuit shown in FIG. 1.

The only problem that remains is the motion of image which is introduced by the scan mirror. To remove this an image correction circuit 27 which will be described in detail at FIG. 5 is inserted in the path of the original video signal (z) with controls inputs from the horizontal and vertical pulse shaping circuits or even the oscillators themselves. If it is preferred to make this correction at the receiver, circuit 20 can be inserted in the path of the detected video signal after the synchronizing and blanking pulses have been separated and are available as inputs.

Figure 2:
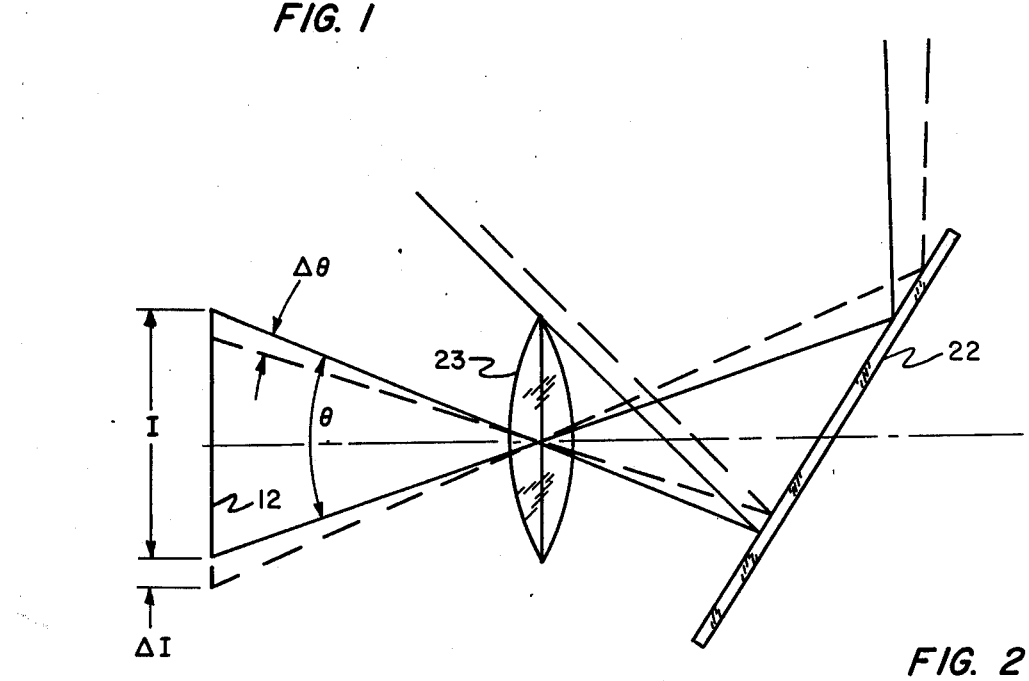
FIG. 2 shows a ray diagram of the optical scanning system in FIG. 1.

FIG. 2 shows a ray diagram of a typical optics system. The total field of view is shown by the angle $\theta$ typically subtending a portion I = 20 millimeters in the horizontal dimension of the vidicon target. The scan motion $\Delta \theta$ is defined by the arctangent of the distance moved on the target ($\Delta$I) divided by the focal length of lens 24 ($\Delta\theta$ = TAN $^{-1}(\Delta$ I/f). A typical value for the maximum angular excursion is about 10% of the horizontal dimension. The time rate of change of the angular scan $\Delta\theta$ is $\Delta \theta/t$. For small angular scans the $\Delta\theta$ can be approximated by the arc tangent equal to the angle in raidans i.e. $\Delta\theta \simeq \Delta$ I/f. Then $\Delta \theta/\Delta$ t = $1/f \Delta I/\Delta t$ where $\Delta I/\Delta t$ is the linear velocity of the thermal image moving over the target material. Since the pyroelectric material exhibits a temporal as well as a spatial response, the scan velocity is chosen for optimum response in the pyroelectric material. The tolerance in the pyroelectric temporal response allows constant linear scan drives for the mirror which are within the art.

Unfortunately, however, the image motion which has been introduced to permit a.c. detection of a stationary image is evident on the readout display.

Figure 3:
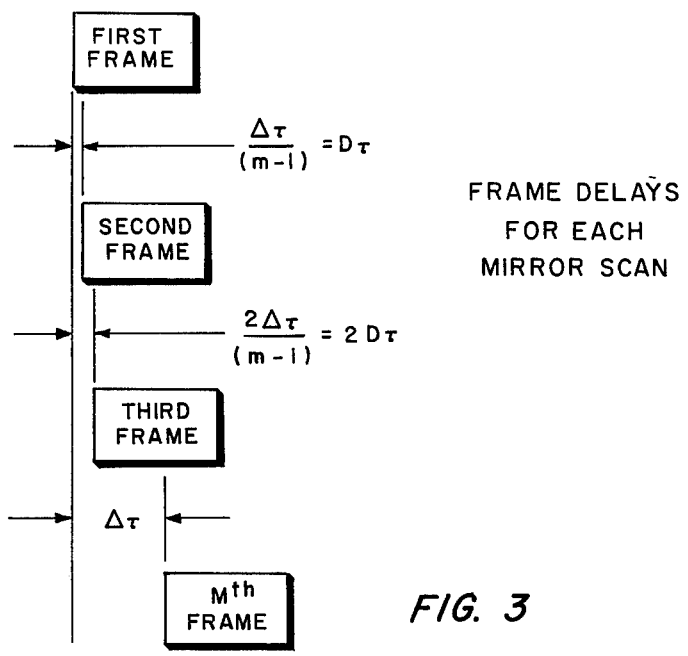
FIG. 3 shows the horizontal delay in successive frames due to optical scanning.

FIG. 3 illustrates the most distracting effect caused by mirror scanning action. Between each frame of the video signal a delay of $D_f = (\Delta$ t/(m−1)) is introduced, where m is the number of frames generated during the mirror scan. Thus, the third frame is delayed ($2\Delta t/(m-1)$) and the $m_{th}$ frame is delayed $\Delta t$. The frames, which are shown separated vertically for clarity, actually appear in an overlapping relationship. This effect combined with the persistance of the tube phosphor produces ghost images in the final image and makes observation uncomfortable. A lesser but still somewhat annoying effect occurs within each frame.

Figure 4:
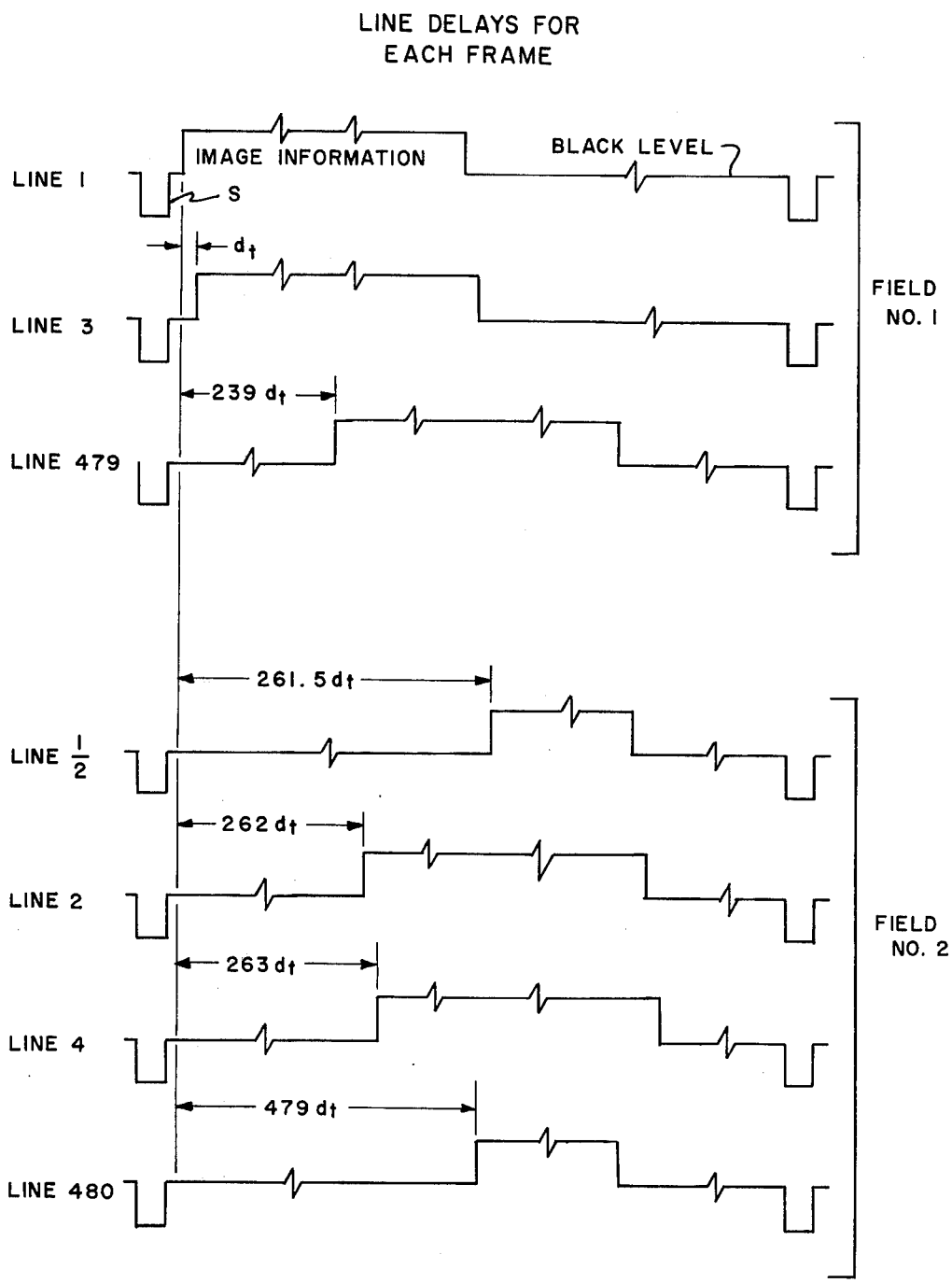
FIG. 4 shows an exaggerated representation of a single frame display raster as presented by the cathode ray tube (CRT) in FIG. 1.

FIG. 4 shows an exaggerated graph of the line to line relationship at the vidicon video output. Each line is timed by a horizontal synchronizing and blanking pulse (S) lasting for a period of approximately ten microseconds shortly after which the electron beam is energized. Video output signals are generated by the beam until the next horizontal synchronizing and blanking pulse biases the electron gun well below the blank level to permit the well known flyback or retrace of the beam path to the beginning of the next line (in time sequence). Thus the pulse at the end of line 1 and the beginning of line 3 are the same and the same relationship exists between all odd numbered (spacial sequence) lines up to line 479 (when 480 active lines are employed). A first vertical synchronizing and blanking pulse (not shown) overlaps the pulse after line 479 eliminating the next 22.5 lines while the beam path returns to the point centered one line space above line 1. A filler half line is generated and the beam path is deflected during the subsequent synch pulse which starts line 2, to the beginning of line 2. The even lines are generated in the same fashion as the odd ones with a second vertical synchronizing and blanking pulse overlapping and eliminating half of line 480 and the next 22 lines to permit beam retrace to line 1. The odd or even lines shown thus each constitute a 240 line interlace field, considering the filler line to complete line 480. The two consecutive fields constitute one frame.

The effect of the mirror scan is to delay the start of the video signals at line 3 a time period $d_l$ after the end of the horizontal pulse. The delay at line 5 is 2$d_l$ and so forth for a maximum delay of 239 $d_l$ in the first field. The delay continues to increase during retrace between fields to 261.5 $d_l$ for start of the filler half line above line 1, 262$d_l$ at line 2 and culminates in a delay of 479$d_l$ at line 480. The line to line delay $d_l$ is related to the frame to frame delay $D_f$ by their relative frequencies, i.e. (for standard TV) $D_f = (15,750 d_l/30 D_f) = 525 d_l/D_f$. These delays each produce different effect on image as seen in the monitor, both of which can be troublesome to a viewer attempting to analyze fine detail. These will be discussed as the means for correcting them is described.

FIG. 5 shows the image correction circuit 20 from FIG. 1 which is capable of correcting the effects due to both of the above mentioned delays. To correct the frame delays the video signal is applied sequentially, by means of a frame signal commutator 41, to the successive taps of A, B, C, etc. of a delay line 42 containing discrete delay elements 43. The commutator is triggered by a counter 48 which generates a trigger pulse for each k vertical synch signals. If k is made equal to 2 the discrete delay 43 is made equal to $D_f$, the delay between frames. If k is 4 the delay $2D_f$, etc. Similarly the line delays may be compensated by a second line signal commutator 44 having outputs A', B', etc. and delay line 45 with discrete delays of $nd_f$. The second commutator is driven by a counter which provides a trigger pulse for every n horizontal synch pulses. The output of the k counter may be used to reset the second commutator to A' for each frame. There are a number of sources R for the resetting pulses to the frame commutator. For on-site correction the signal can be obtained from the servo sensor 25 (FIG. 1) on the mirror axis. At remote sites a circuit may be provided which detects the long blanking pulses generated during the lockup period of the oscillators, or it may be simply keyed in by the operator. The commutator may thus have additional unused outputs and still perform properly.

The choice of values for $k$ and $n$ in counter 48 or 49 depends on the rate at which the image is scanned across the pyroelectric target material and the resolution capabilities of the material itself. If a value of $k$ greater than 2 is used there will obviously be no need for line to line correction. The latter correction tends to skew the picture into a trapezoidal shape while the former tends to smear the image horizontally. When line to line corrections are required, it is very doubtful that correction of each individual line ($n = 1$) could ever be justified. As is evident from FIG. 4 not only would the delay at one of elements 46 have to be different from the rest, but there would be a very large number of them. Integrated circuit demultiplexers are currently available which can handle 40 outputs. Such devices which can handle 480 outputs are obviously within the state of the art, but would be very expensive and/or bulky. As an example, it would be simpler to limit $n$ to a value like 25 which would require no more than 20 elements and avoid the separate consideration of the retrace time between fields. If the mirror scan is linear all of the delay elements in each delay line can be identical. However, if the scan is not linear the delay elements can be uniquely tapered to provide a near perfect presentation.

Many variations of the above correction system are apparent, however, the invention is limited only as disclosed in the claims which follow.

I claim:

1. An image correction circuit for a pyroelectric vidicon wherein a small area image is mechanically scanned over the much larger surface area of a sensing surface of the vidicon target comprising:
   a first signal commutator coupled to the video output of said vidicon means to sequentially channel the video output signal to a plurality of output terminals; and
   a first tapped delay line having a like plurality of large equal delay taps connected to said output terminals, so as to provide periodically decreasing delay for each frame of said video signal.

2. A correction circuit according to claim 1 further comprising:
   a second commutator coupled to the output of said first delay line; and
   a second delay line with small equal delay taps coupled to the outputs of said second commutator each of said large delay taps providing an integral number of times the delay of said small taps.

3. A correction circuit according to claim 2 wherein the delay between taps on said first delay line is equal to the delay between the taps on said second delay line multiplied by the number of taps on said second delay line.

4. A correction circuit according to claim 1 wherein: said commutator is an integrated circuit signal demultiplexer and the line delay is an integrated CCD delay device.

* * * * *